United States Patent
Narita et al.

(10) Patent No.: US 7,755,539 B2
(45) Date of Patent: Jul. 13, 2010

(54) DUMMY APPARATUS OR TEST METHOD FOR COLLISION PREDICTION APPARATUS OR ITS COMPONENT

(75) Inventors: Sotaro Narita, Toyota (JP); Setsuo Tokoro, Suzuno (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 217 days.

(21) Appl. No.: 10/593,616

(22) PCT Filed: Mar. 24, 2005

(86) PCT No.: PCT/JP2005/006211

§ 371 (c)(1),
(2), (4) Date: Sep. 21, 2006

(87) PCT Pub. No.: WO2005/093386

PCT Pub. Date: Oct. 6, 2005

(65) Prior Publication Data
US 2007/0214901 A1    Sep. 20, 2007

(30) Foreign Application Priority Data
Mar. 25, 2004    (JP)    .............................. 2004-090389

(51) Int. Cl.
G01S 7/40    (2006.01)
(52) U.S. Cl. .............................. 342/165; 342/5; 342/70
(58) Field of Classification Search .................. 342/165, 342/5, 70
See application file for complete search history.

(56) References Cited

U.S. PATENT DOCUMENTS 6,777,684 B1 *    8/2004    Volkov et al. ............ 250/341.1

(Continued)

FOREIGN PATENT DOCUMENTS

EP    0 165 733    12/1985

(Continued)

OTHER PUBLICATIONS

Korean Office Action dated Nov. 15, 2007.

(Continued)

*Primary Examiner*—Thomas H Tarcza
*Assistant Examiner*—Timothy A Brainard
(74) *Attorney, Agent, or Firm*—Finnegan, Henderson, Farabow, Garrett & Dunner, LLP

(57) ABSTRACT

Clothing 12 made of a cloth is put on a dummy object 11 that is formed into a human-like shape and made of a material having less reflection of electric wave, in order to form a dummy doll 10. Then, a collision prediction test or inspection by a millimeter wave radar is performed while swaying the clothing 12 by a blower 14. By swaying the clothing 12, the result of the measurement with the use of the millimeter wave radar same as that obtained by using an actual human can be obtained. Further, the clothing 12 may be swayed by vibrating the dummy doll 10 or moving the same, instead of the sending air. A reflection plate may be incorporated into the dummy object 11 to change the reflection state of the reflection plate. According to these configurations, the result of the test or inspection similar to the vehicle collision prediction by the millimeter wave radar for an actual pedestrian can be obtained with the use of the dummy doll.

8 Claims, 10 Drawing Sheets

U.S. PATENT DOCUMENTS

| | | | |
|---|---|---|---|
| 2003/0142247 A1* | 7/2003 | Nishiyama et al. | 349/67 |
| 2004/0017313 A1* | 1/2004 | Menache | 342/465 |
| 2004/0245888 A1* | 12/2004 | Aksyuk et al. | 310/309 |
| 2005/0088336 A1* | 4/2005 | Sakamoto et al. | 342/175 |

FOREIGN PATENT DOCUMENTS

| | | |
|---|---|---|
| JP | 6-34671 | 9/1994 |
| JP | 7-311103 | 11/1995 |
| JP | 8-185114 | 7/1996 |
| JP | 10-74040 | 3/1998 |
| JP | 2001-336996 | 12/2001 |
| JP | 2004-85480 | 3/2004 |
| KR | 2000-0167321 | 2/2000 |
| KR | 2001-0063025 | 7/2001 |
| KR | 2002-0061925 | 7/2002 |

OTHER PUBLICATIONS

Korean Office Action dated May 14, 2008.
Korean Office Action dated Jun. 30, 2008.
D. H. Kim et al., "Application and Perspective on Automotive Radar Technology" dated Jan. 18, 2003.
Car Radar (2002).

* cited by examiner

DUMMY APPARATUS OR TEST METHOD FOR COLLISION PREDICTION APPARATUS OR ITS COMPONENT

TECHNICAL FIELD

The present invention relates to a dummy apparatus used for a test or inspection of a vehicle collision prediction apparatus or its component, and a test method for the collision prediction apparatus or its component.

BACKGROUND ART

Conventionally, there has been performed a test in which a vehicle is collided with a dummy object having a shape of a human for obtaining information indicating a condition of each part of a human body upon the collision based upon the information from various sensors attached to the dummy object, such as an acceleration sensor, load sensor, and displacement sensor, in order to strengthen the safety of pedestrians upon the collision of a vehicle (refer to Japanese Utility Model Examined Patent application No. HEI6-34671).

However, since the conventional dummy object presupposes a vehicle collision, it is not effective for the prediction of collision between pedestrians and a vehicle that has recently been developed. Specifically, a collision prediction apparatus for a vehicle that has recently been developed uses a millimeter wave radar and image sensor to predict and cope with the collision before the vehicle actually collides a pedestrian.

The present inventors have formed a dummy object (so-called mannequin) into a shape of a human with the use of a material having less reflection of electric wave (e.g., foam member such as styrene foam), dressed the dummy object to make a dummy doll 1, and put this dummy doll 1 in front of a vehicle, as shown in FIG. 13. Then, the present inventors have operated a collision prediction apparatus mounted to a vehicle and composed of a millimeter wave radar 2, plural image sensors 3, and a computer 4, thereby conducting a test or inspection pertaining to a collision prediction to a pedestrian. Alternatively, the present inventors have operated a collision prediction apparatus that is not yet mounted to a vehicle and is composed of a millimeter wave radar 2, plural image sensors 3, and a computer 4, or the components of the collision prediction apparatus, thereby conducting the aforesaid test or inspection.

However, the present inventors have found through this test or inspection that the result of this test or inspection is different from the result of a test or inspection in which an actual human is made stand in front of the collision prediction apparatus. In view of this, the present inventors have found from various experiments that the change with time of the intensity of the reflection wave inputted by the millimeter wave radar 2 is different between the case of the actual human and the case of the dummy doll 1. Specifically, the present inventors have found that the change with time of the reflection intensity of a millimeter wave is different between the case of the actual human and the case of the dummy doll 1. FIG. 14 shows a result of the experiment showing the difference in the reflection intensity of a millimeter wave. The change of the reflection intensity of a millimeter wave with time by the dummy doll 1 is very small as indicated by a solid line obtained by linking black squares. On the other hand, the change of the reflection intensity of a millimeter wave with time by the actual human is great as indicated by a broken line obtained by linking black triangles. It is to be noted that, in the case of human, the result of the undressed state is the same as in the dressed state.

As a result of the further experiment, the present inventors have found that the change with time of the reflection intensity of a millimeter wave is increased by swaying the clothing put on the dummy object (see the solid line obtained by linking black circles in FIG. 2). It is estimated that this phenomenon is caused by the following fact. Specifically, the cloth constituting the clothing has a characteristic of transmitting a part of the millimeter wave and reflecting a part thereof, and the state of the cloth in the advancing direction of the millimeter wave changes with time by the swaying movement of the cloth. Further, the present inventors have thought of a reflection plate, which reflects the millimeter wave, attached to the dummy object, and made the experiment for this. In this case, the present inventors have confirmed that the change with time of the reflection intensity of the millimeter wave increases particularly by changing the state of the reflection plate (see the solid line obtained by linking black circles in FIG. 7).

DISCLOSURE OF THE INVENTION

The present invention is accomplished on the basis of the above-mentioned finding and idea, and aims to provide a dummy apparatus used for a test or inspection of a vehicle prediction apparatus or its component that can provide the result of the test or inspection same as the collision prediction for an actual pedestrian. Further, another object of the present invention is to provide a test method for a vehicle collision prediction apparatus or a component thereof that can provide a test result same as the test result for an actual pedestrian.

In order to accomplish the aforesaid objects, the feature of the present invention is a dummy apparatus for a test or inspection of a vehicle collision prediction apparatus or a component thereof, wherein a dummy object having less reflection of electric wave is covered with a cloth, and the cloth is swayed. In this case, the cloth may be swayed by a blower that sends air toward the dummy object. Further, the cloth may be swayed by vibrating the dummy object with the use of a vibrating apparatus attached to the dummy object. This vibrating apparatus can be provided with an actuator for automatically vibrating the dummy object. As the vibrating apparatus, an elastic member such as a spring may be attached to the dummy object, wherein the dummy object is displaced by hands or tools to keep the dummy object vibrating by the elastic member.

Moreover, the cloth may be swayed by moving the dummy object with the use of a moving apparatus attached to the dummy object. Further, the dummy object can be hung down with a rope, cable, rod, or the like.

In these cases, the change with time of the reflection intensity of the millimeter wave by the dummy object covered with the cloth increases as indicated by the solid line obtained by linking black circles in FIG. 2, and it is similar to the change with time of the reflection intensity of the millimeter wave by an actual human (see the broken line obtained by linking black triangles in FIG. 2) from the result of the experiment. Accordingly, by using the dummy apparatus having the feature of the invention, the result of a test or inspection similar to the collision prediction for an actual pedestrian can be provided in the test for a collision prediction apparatus having a millimeter wave radar or for the millimeter wave radar that is the component of the collision prediction apparatus, and hence, effective.

Further, the feature of the present invention is a dummy apparatus wherein the dummy object is shaped into a human, and the cloth is clothing. With this configuration, the dummy object having a shape of a human can surely be recognized as a pedestrian in a vehicle collision prediction apparatus having an image sensor, whereby the result of the test or inspection similar to the collision prediction for an actual pedestrian can be obtained. Therefore, the invention is effective.

Moreover, the feature of the present invention is a dummy apparatus for a test or inspection of a vehicle collision prediction apparatus or a component thereof, wherein a reflection plate that reflects a millimeter wave is attached to the dummy object. In this case, plural reflection plates may be provided. Further, drive means for displacing the reflection plate relative to the collision prediction apparatus may be provided. An area changing apparatus for changing the reflection area of the reflection plate with time may be provided. A drive apparatus for deforming the reflection plate may further be provided.

In these cases, the change with time of the reflection intensity of the millimeter wave by the dummy object provided with the reflection plate increases as indicated by the solid line obtained by linking black circles in FIG. 7, and it is similar to the change with time of the reflection intensity of the millimeter wave by an actual human (see the broken line obtained by linking black triangles in FIG. 7) from the result of the experiment. Accordingly, by using the dummy apparatus having another feature of the invention, the result of a test or inspection similar to the collision prediction for an actual pedestrian can be provided in the test for a collision prediction apparatus having a millimeter wave radar or for the millimeter wave radar that is the component of the collision prediction apparatus, and hence, effective.

Still another feature of the present invention is that the dummy object is shaped into a human. In this case, the dummy object may be covered with a cloth, e.g., clothing. With this configuration, the dummy object having a shape of a human can surely be recognized as a pedestrian in a vehicle collision prediction apparatus having an image sensor, whereby the result of the test or inspection similar to the collision prediction for an actual pedestrian can be obtained. Therefore, the invention is effective.

Still another feature of the present invention is a test method that uses the above-mentioned dummy apparatus to test a vehicle collision prediction apparatus or a component thereof. Accordingly, the vehicle collision prediction apparatus or the component thereof can be inspected under the condition similar to the collision prediction for an actual pedestrian from the aforesaid reason, whereby the collision prediction apparatus or the component thereof can satisfactorily be tested.

BRIEF DESCRIPTION OF THE DRAWINGS

Various other objects, features and many of the attendant advantages of the present invention will be readily appreciated as the same becomes better understood by reference to the following detailed description of the preferred embodiment when considered in connection with the accompanying drawings, in which.

BEST MODE FOR CARRYING OUT THE INVENTION

First Embodiment

Figure 1A:
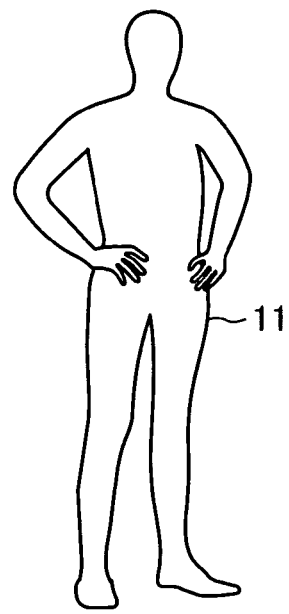
FIG. 1A is a schematic view of a dummy object according to a first embodiment of the present invention.
Figure 1B:
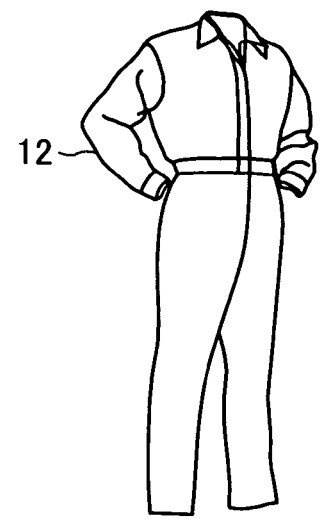
FIG. 1B is a schematic view of clothing put on the dummy object.
Figure 1C:
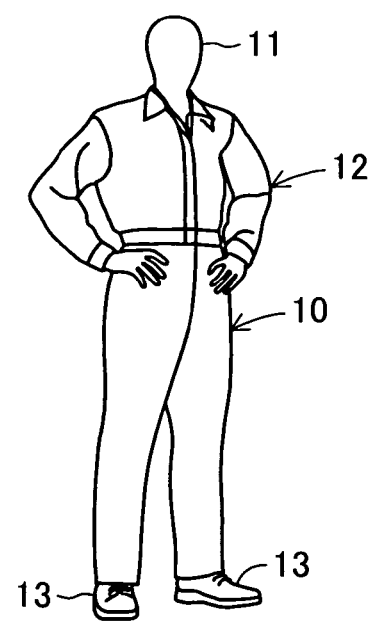
FIG. 1C is a schematic view for explaining a used state of the dummy doll wearing the clothing.
Figure 1C:
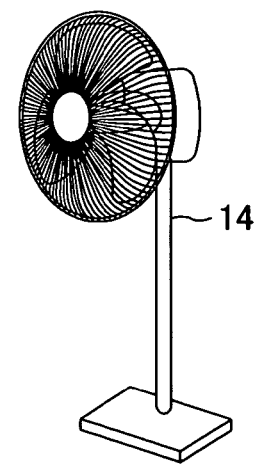

A first embodiment of the present invention will be explained with reference to drawings. FIG. 1A shows a dummy object 11 according to the first embodiment. This dummy object 11 is made of a member having less reflection of electric wave (particularly a millimeter wave), i.e., a member having small reflectivity of electric wave (particularly a millimeter wave) (e.g., foam member such as styrene foam) that is shaped into a human. Clothing 12 made of a cloth shown in FIG. 1B and shoes 13 are put on the dummy object 11 to form a dummy doll 10 shown in FIG. 1C. In this case, any clothing can be used for the clothing 12 so long as it is made of a cloth. Air is sent to the dummy doll 10 by a blower 14. The member constituting the dummy object 11 transmits the millimeter wave, while the cloth constituting the clothing 12 transmits a part of the millimeter wave but reflects a part thereof.

Figure 13:
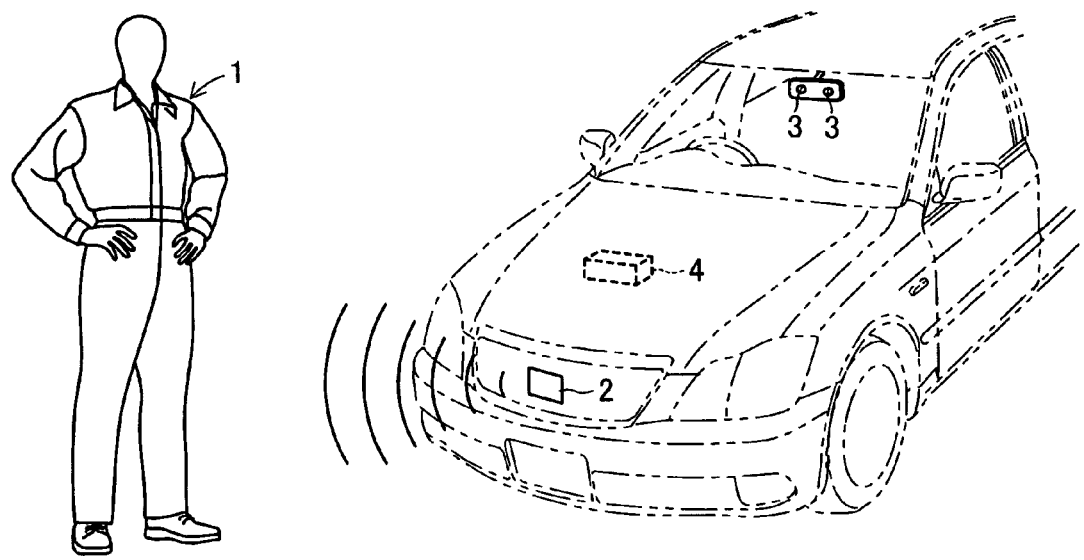
FIG. 13 is a schematic view for explaining a collision prediction test using the dummy doll.
Figure 14:
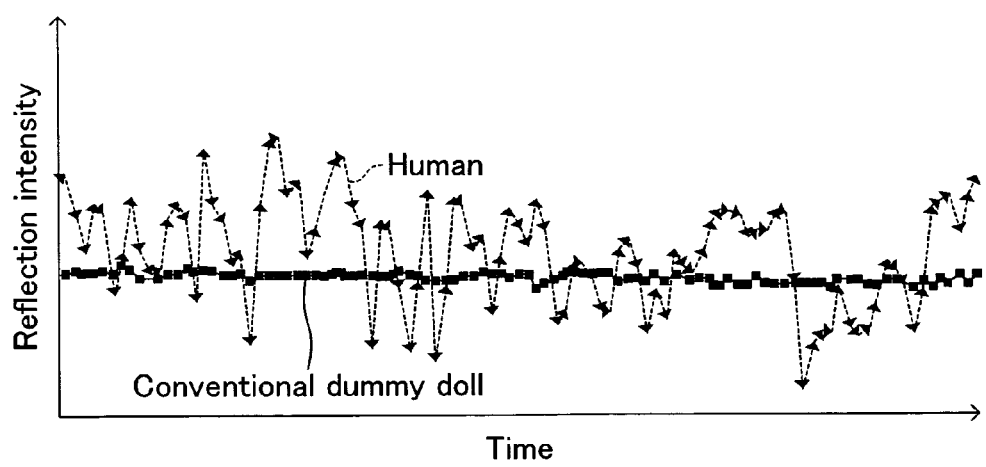
FIG. 14 is a graph for explaining a reflection characteristic of a millimeter wave relating to a conventional apparatus and a human.

With this state, the dummy doll 10 is put in front of a vehicle having mounted thereto a collision prediction apparatus provided with a millimeter wave radar 2, plural image sensors 3 and computer 4, and a test or inspection relating to the collision prediction for a pedestrian by the collision prediction apparatus mounted to the vehicle is performed with various conditions changed, as explained as the conventional technique with the use of FIG. 13. Alternatively, a test or inspection relating to the collision prediction for a pedestrian is carried out by a collision prediction apparatus that is not yet mounted to a vehicle and composed of the millimeter wave radar 2, plural image sensors 3 and computer 4 or by the millimeter wave radar 2 or the image sensors 3 that are the components of the collision prediction apparatus.

In this test or inspection, a millimeter wave is emitted to the dummy doll 10 from the millimeter wave radar 2, and the reflection of the millimeter wave from the dummy doll 10 is received by the millimeter wave radar 2. Further, the image sensors 3 image-capture the dummy doll 10. Then, the received signal and the result of the image-capture are inputted to the computer 4 or another computer disposed for the test or inspection, in order to perform various tests or inspections under various conditions such as the degree of the recognition of the dummy doll 10, the behavior of the dummy doll 10 upon the collision of the vehicle, and the like.

Figure 2:
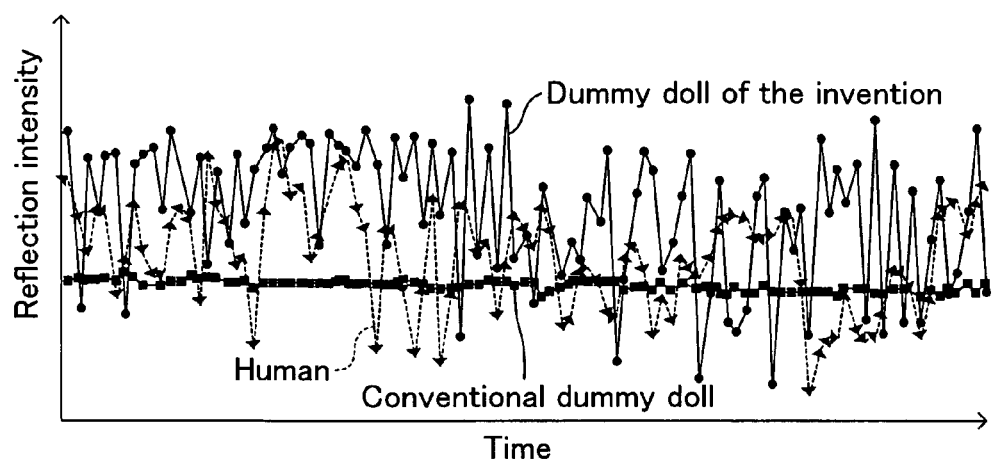
FIG. 2 is a graph for explaining a reflection characteristic of a millimeter wave relating to the first embodiment.

FIG. 2 is a result of the experiment showing that the reflection of the millimeter wave from the dummy doll 10 to which air is sent by the blower 14 is satisfactory. When the change with time of the reflection intensity of the millimeter wave from the dummy doll 10 is measured under the condition in which air is sent to the dummy doll 10, the change with time of the reflection intensity of the millimeter wave takes the graph obtained by linking black circles. On the other hand, when the change with time of the reflection intensity of the millimeter wave from the dummy doll 10 is measured under the condition in which air is not sent to the dummy doll 10, the change with time of the reflection intensity of the millimeter wave takes the graph obtained by linking black squares. The graph obtained by linking black triangles indicates the change with time of the reflection intensity of the millimeter wave in case where the millimeter wave is emitted to a human.

From this experiment, the reflection intensity of the millimeter wave from the dummy doll 10 hardly changes with time when air is not sent from the blower 14, which means that this reflection intensity is far from the reflection state of the millimeter wave from an actual human. It has been found that, when air is sent from the blower 14, the reflection intensity of the millimeter wave from the dummy doll 10 changes with time, which means that the state generally similar to the reflection state of the millimeter wave from an actual human can be created. It is considered that this phenomenon is caused by the swaying movement of the cloth, constituting the clothing 12 and having transmission property and reflection property, caused by a blow.

Accordingly, air is sent from the blower 14 to the dummy doll 10 wearing the clothing 2 for swaying the cloth of the clothing 12 as in the aforesaid first embodiment, whereby the result of the measurement of the millimeter wave by the millimeter wave radar 2 can be made generally similar to the result of the measurement for a human. Consequently, a test or inspection, including a recognition of a pedestrian, by a collision prediction apparatus including the millimeter wave radar 2 can satisfactorily be performed. Further, the performance test for the millimeter wave radar 2 can satisfactorily be performed. Moreover, since the dummy doll 10 has the outer shape same as a human in the above-mentioned embodiment, the test or inspection of the collision prediction, including the recognition of a pedestrian or posture of a pedestrian, by a collision prediction apparatus including the image sensors 3 or the test or inspection of the image sensors 3 can satisfactorily be performed.

Figure 3A:
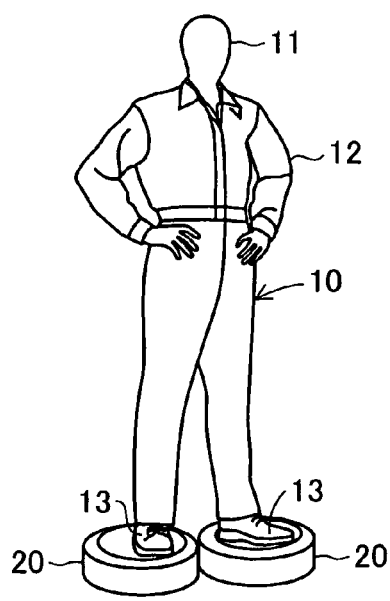
FIG. 3A is a schematic view of a dummy doll according to a first modified example of the first embodiment.
Figure 3B:
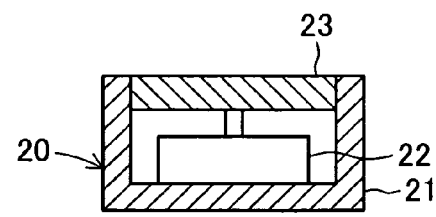
FIG. 3B is a sectional view of a vibrating apparatus.

Subsequently, various modified examples of the first embodiment will be explained. In the first modified example, the shoes 13, 13 of the dummy doll 10 formed by the same manner as in the first embodiment are fixed to vibrating apparatuses 20, 20 as shown in FIG. 3A. The vibrating apparatus 20 has a cylindrical housing 21 with a bottom surface as shown in FIG. 3B. A vibrator 22 that operates by a battery not shown is accommodated in the housing 21. The vibrator 22 vibrates a vibrating plate 23 that is mounted on the inner peripheral surface at the upper part of the housing 21 so as to be slidable in the vertical direction. The shoes 13 of the dummy doll 10 are fixed to the vibrating plate 23.

According to the first modified example thus configured, the dummy doll 10 vibrates in the vertical direction by operating the vibrator 22 to vibrate the vibrating plate 23. The cloth constituting the clothing 12 sways due to the vibration of the dummy doll 10. Therefore, when the aforesaid test or inspection is carried out with the dummy doll 10 vibrated by the vibrating apparatus 20, the effect same as that in the first embodiment can be expected according to the first modified example.

Figure 4:
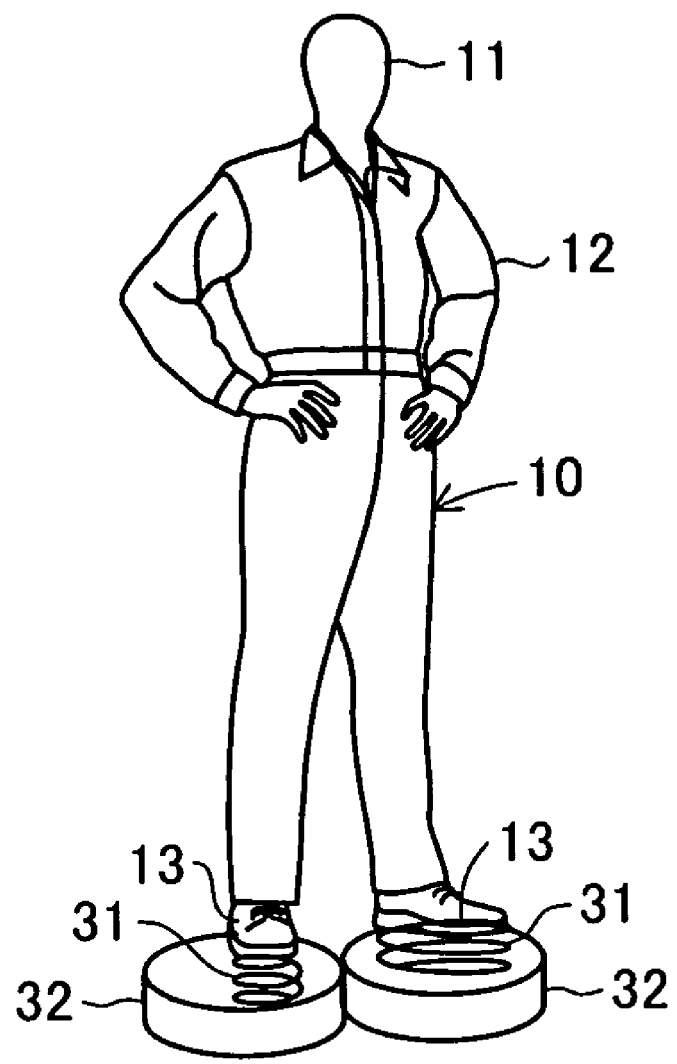
FIG. 4 is a schematic view of a dummy doll according to a second modified example of the first embodiment.

Subsequently, a second modified example of the first embodiment will be explained. In this second modified example, the shoes 13, 13 of the dummy doll 10 formed by the same manner as in the first embodiment are respectively fixed to bases 32, 32 through coil springs 31, 31 as shown in FIG. 4. In the second modified example thus configured, when impact is given to the dummy doll 10, the dummy doll 10 keeps on vibrating due to the elastic force of the springs 31, 31 after that. The cloth constituting the clothing 12 sways due to the vibration of the dummy doll 10. Therefore, when the aforesaid test or inspection is carried out with the dummy doll 10 vibrated by the springs 31, 31, the effect same as that in the first embodiment can be expected according to the second modified example.

It should be noted that, in the second modified example provided with the springs 31, 31, the dummy doll 10 may be vibrated by the vibrating apparatus 20 of the first modified example. Further, the springs 31, 31 may not have a coil shape but have a plate-like shape. Moreover, instead of the springs 31, 31, an elastic member such as sponge or rubber may be employed.

Figure 5A:
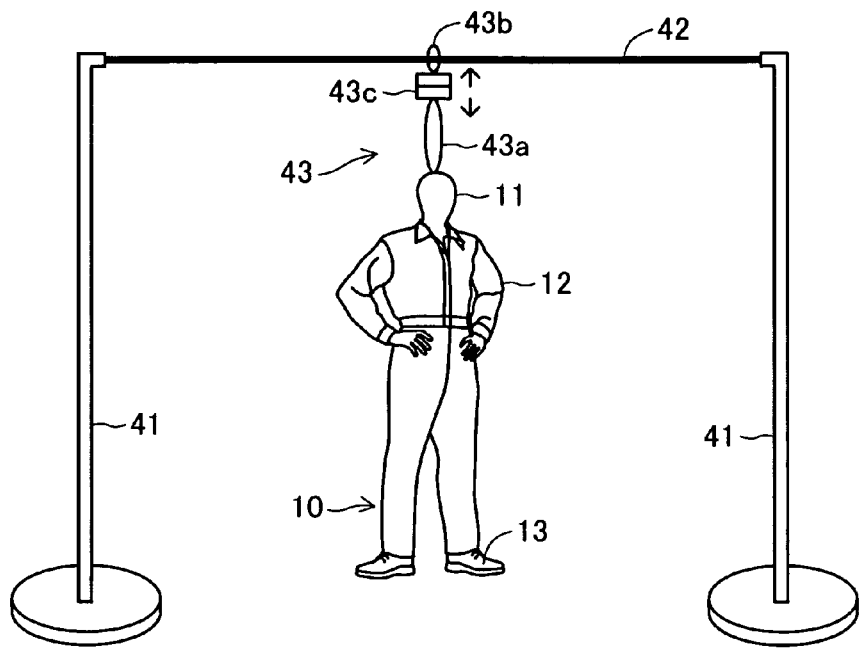
FIG. 5A is a schematic view of a dummy doll according to a third modified example of the first embodiment.

Subsequently, a third modified example of the first embodiment will be explained. In this third modified example, both ends of a cable 41 are connected to the upper ends of a pair of supports 41, 41 as shown in FIG. 5A. The dummy doll 10 is lifted from a ground or floor by a lifting tool 43 that is fixed to the head of the dummy doll 10 formed by the same manner as in the first embodiment so as to be movable along the cable 42. The lifting tool 43 has a first cable 43a that fixes the head of the dummy doll 10 at its lower end, a second cable 43b that is engaged with the cable 42 in such a manner that the upper end thereof can be moved, and a joint tool 43c disposed between the first cable 43a and the second cable 43b. The joint tool 43c always keeps the connection between the first cable 43a and the second cable 43b. However, the joint tool 43c releases the connection between the first cable 43a and the second cable 43b when force more than a predetermined amount is applied, in order to measure the moving direction of the dummy doll 10 upon the collision of the vehicle.

In the third modified example thus configured, the cloth constituting the clothing 12 sways when the dummy doll 10 hanging from the cable 42 swings. Therefore, when the aforesaid test or inspection is carried out with the dummy doll 10 swayed, the effect same as that in the first embodiment can be expected according to the third modified example.

Figure 5B:
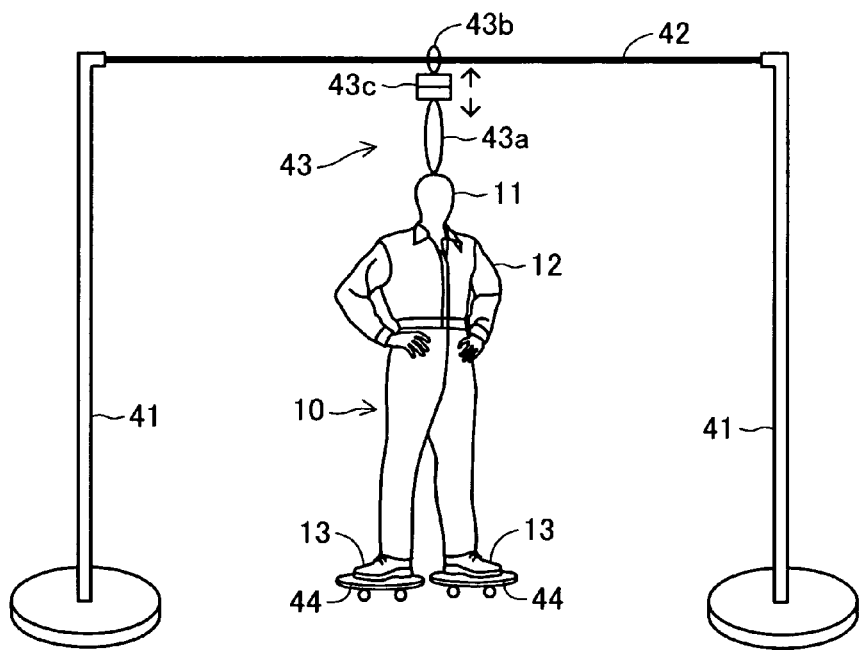
FIG. 5B is a schematic view of a dummy doll further modified in the third modified example.

As shown in FIG. 5B, the shoes 13, 13 of the dummy doll 10 may be fixed respectively to roller skates 44, 44 that can be rotated on the ground or floor and are provided with a drive apparatus such as an electric motor. The roller skate 44 provided with the drive apparatus may be fixed only to one of the shoes 13, while the roller skate 44 not provided with the drive apparatus may be fixed to the other shoe 13 or the other shoe 13 may be lifted from the ground or floor. With this configuration, the dummy doll 10 moves by operating the roller skate 44 provided with the drive apparatus with a remote control. The cloth constituting the clothing 12 sways when the dummy doll 10 moves. Therefore, when the aforesaid test or inspection is carried out with the dummy doll 10 moved by the roller skate 44, the effect same as that in the first embodiment can be expected according to the second modified example.

The other members such as a rope, thin slender rod, or the like can be used instead of the cable 42 so long as they can hang the dummy doll 10 so as to be movable. Further, various moving apparatuses can be utilized without using the roller skate 44 as means for moving the dummy doll 10.

Second Embodiment

Figure 6A:
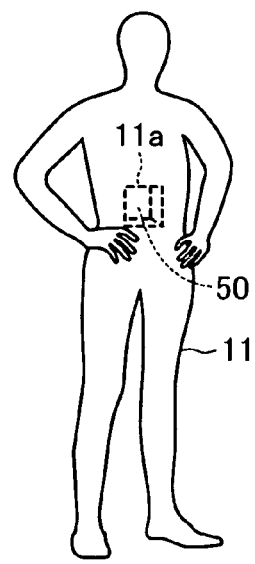
FIG. 6A is a schematic view of a dummy object according to a second embodiment of the present invention.
Figure 6B:
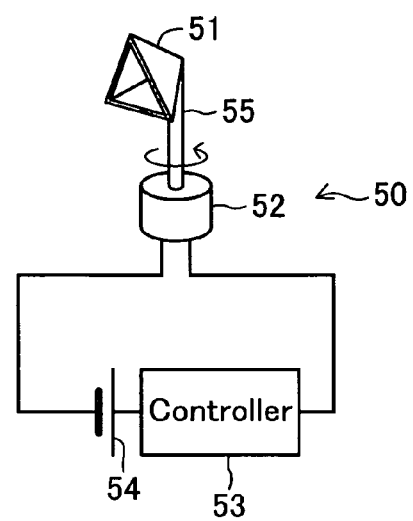
FIG. 6B is a schematic view of a reflection apparatus.

Subsequently, the second embodiment of the present invention will be explained with reference to drawings. FIG. 6A shows a dummy object 11 according to the second embodiment. This dummy object 11 is also made of a member having less reflection of electric wave (particularly a millimeter wave), i.e., a member having small reflectivity of electric wave (particularly a millimeter wave) (e.g., foam member such as styrene foam) that is shaped into a human. It is to be noted that a hollow 11a is formed to the dummy object 11, wherein a reflection apparatus 50 is accommodated in the hollow 11a. The reflection apparatus 50 is composed of a reflector 51, electric motor 52, controller 53 and battery 54 as shown in FIG. 6B.

The reflector 51 is composed of a corner reflector. The corner reflector is a metallic plate made of aluminum having high reflectivity to the millimeter wave and formed into a triangular pyramid. One face of the corner reflector is open. Therefore, the corner reflector is configured to reflect the millimeter wave incident to the inside thereof in a prescribed direction with high reflection intensity. The electric motor 52 couples the reflector 51 via a connecting shaft 55. The electric motor 52 rotates the reflector 51 with its rotation. The controller 53 controls the rotation of the electric motor 52 through the supply of electric power from the battery 54.

Figure 6C:
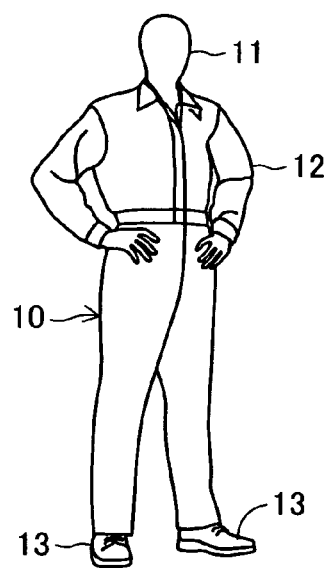
FIG. 6C is a schematic view of a dummy doll obtained by putting the clothing on the dummy object.

The clothing 12 same as that in the first embodiment and shoes 13 are put on the dummy object 11 having incorporated therein the reflection apparatus 50 as shown in FIG. 6C. In this second embodiment, since the reflection of the millimeter wave by the reflection apparatus 50 is utilized as described later, it is unnecessary to put the clothing 12 on the dummy object 11.

In the dummy doll 10 thus configured, a test or inspection for a collision prediction apparatus including at least the millimeter wave radar 2 is performed, the performance test for the millimeter wave radar 2 is performed, a test or inspection for a collision prediction apparatus including at least image sensors 3 is performed, or a test or inspection for the image sensor 3 is performed, with the electric motor 52 rotated, like the first embodiment.

Figure 7:
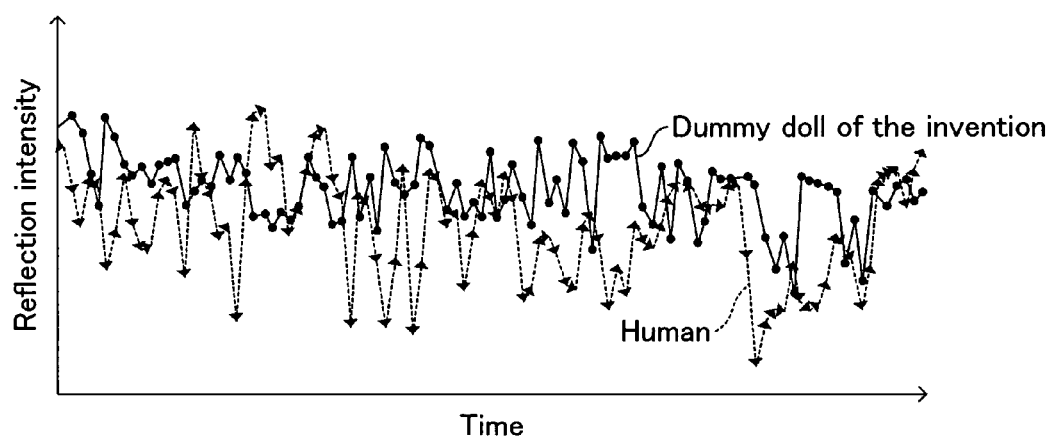
FIG. 7 is a graph for explaining a reflection characteristic of a millimeter wave relating to the second embodiment.

In the test or inspection described above, the millimeter wave emitted from the millimeter wave radar 2 is reflected by the reflection apparatus 50. At this time, since the reflector 51 (corner reflector) is rotatably driven by the electric motor 52, the reflection state of the millimeter wave is changed with time. The graph of solid line linking black circles in FIG. 7 shows the change with time of the reflection intensity of the millimeter wave from the dummy doll 10 with this state. On the other hand, the graph of broken line obtained by linking black triangles shows the change with time of the reflection intensity of the millimeter wave when the millimeter waver is emitted to a human. Therefore, the reflection state generally similar to the reflection state of the millimeter wave from an actual human can be created even by using the dummy doll 10 according to the second embodiment, whereby the effect same as that in the first embodiment can be expected in the aforesaid test or inspection.

Although the reflection state of the reflector 51 is changed by the rotation of the reflector 51 by the electric motor 52 in the second embodiment, the reflection state of the reflector 51 may be changed in such a manner that the reflector 51 may be vibrated with the use of a vibrator, or the reflector 51 may be moved with the use of a moving apparatus.

Figure 8A:
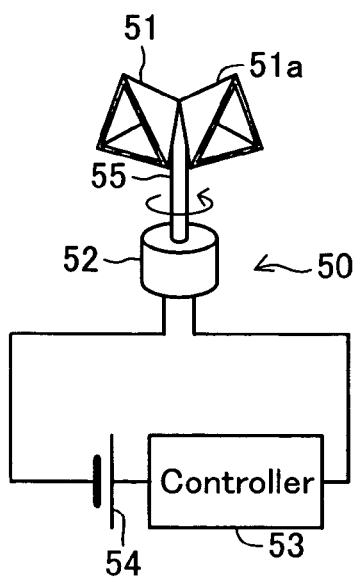
FIG. 8A is a schematic view showing one example of a reflection apparatus according to a first modified example of the second embodiment.
Figure 8B:
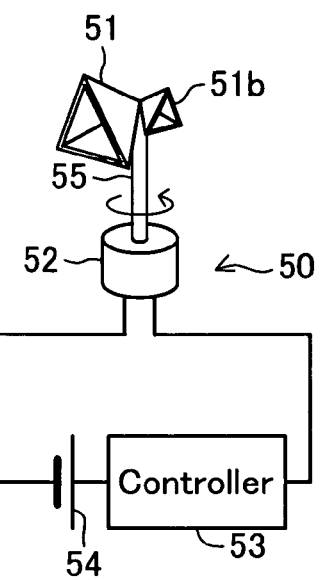
FIG. 8B is a schematic view showing another example of a reflection apparatus according to a first modified example of the second embodiment.

Subsequently, the first modified example of the second embodiment will be explained. This first modified example is different from the second embodiment in that plural reflectors composed of the corner reflector are provided. For example, a reflector 51a composed of the corner reflector of the same size may be added as shown in FIG. 8A. Further, more reflectors composed of the corner reflector may be provided. Moreover, a reflector 51b composed of a corner reflector of a different size may be added as shown in FIG. 8B. More reflectors composed of a corner reflector of a different size may be provided. With this configuration, the reflection of the millimeter wave varies in more complicated manner, whereby the human characteristic can more satisfactorily be imitated.

Figure 9:
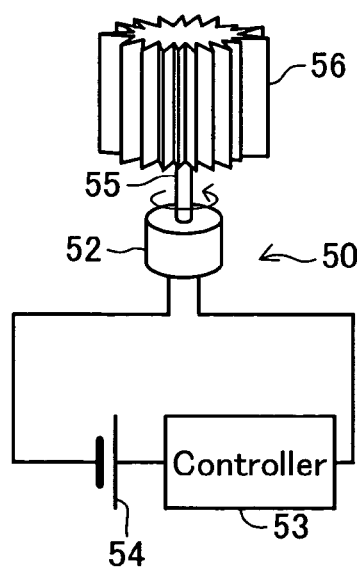
FIG. 9 is a schematic view of a reflection apparatus according to a second modified example of the second embodiment.

Subsequently, a second modified example of the second embodiment will be explained. In this second modified example, a reflector 56 formed into generally a cylindrical shape is used instead of the corner reflector serving as the reflector 51 as shown in FIG. 9. This reflector 56 is also made of a metal that reflects the millimeter wave such as aluminum. It is configured to rotate about the shaft via the connecting shaft 55 by the electric motor 52. This reflector 56 has, at the outer peripheral face, concave/convex portion formed with a great number of mountain parts and valley parts each having a sectional shape of a triangle along its circumferential direction. Each of the mountain parts and valley parts may have the same shape and same size, but it is preferable that the shape and size of each of the mountain parts and valley parts are differed, or the space is differed.

In the second modified example thus configured, the reflector 56 makes the reflection of the millimeter wave complicated by the rotation of the electric motor 52, whereby the human characteristic can satisfactorily be imitated. Accordingly, the effect same as that in the second embodiment can be expected according to the second modified example.

Figure 10A:
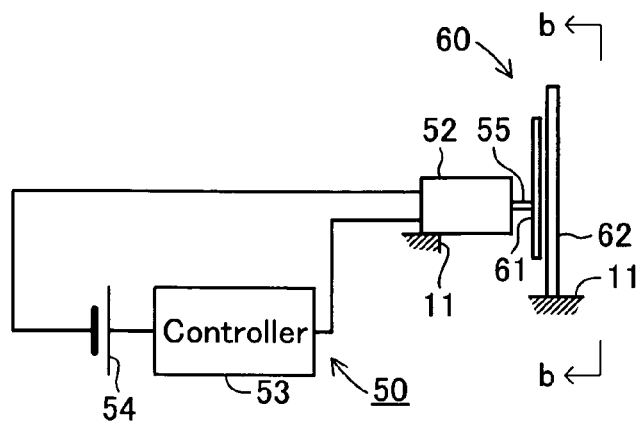
FIG. 10A is a schematic view of a reflection apparatus according to a third modified example of the second embodiment.
Figure 10B:
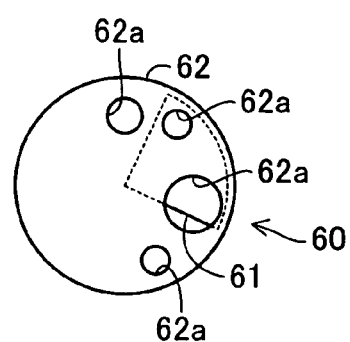
FIG. 10B is a front view of a reflector taken along a line b-b in FIG. 10A.

Subsequently, a third modified example of the second embodiment will be explained. This third modified example uses a reflector 60 that is different from the reflector 51 as shown in FIGS. 10A and 10B, instead of the corner reflector serving as the reflector 51. This reflector 60 has a reflection plate 61 that rotates about a shaft through the connecting shaft 55 by the electric motor 52. The reflection plate 61 is made of a metallic material that reflects the millimeter wave, such as aluminum, and is formed into a fan-like shape. A circular reflection absorption plate 62 fixed to the dummy object 11 is arranged in front of the reflection plate 61. Plural through-holes 62a are formed on this reflection absorption plate 62 at the positions corresponding to the reflection plate 61. Although the size of each of the through-holes 62a is differed from each other in this modified example, the size thereof may be the same. It is to be noted that, from the viewpoint of making the reflection characteristic of the millimeter wave complicated, the size of each of the through-holes 62a is preferably differed from each other, or the shape thereof is preferably differed from each other, like the above-mentioned example.

In the third modified example thus configured, the millimeter wave incident on the reflection absorption plate 62 is absorbed, and only the millimeter wave passing through the through-holes 62a is reflected. The rotational position of the reflection absorption plate 62 varies due to the rotation of the electric motor 52, whereby the reflection state of the millimeter wave by the reflection plate 61, i.e., the reflection state of the reflector 60 changes with time. Accordingly, the effect same as that in the second embodiment can be expected in this third modified example.

Figure 11A:
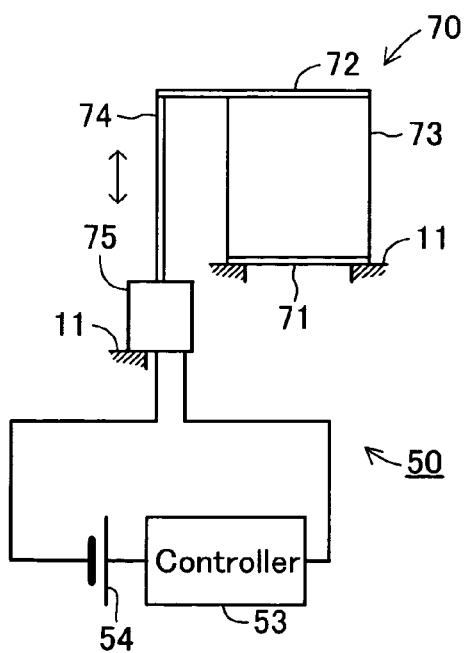
FIG. 11A is a schematic view of a reflection apparatus according to a fourth modified example of the second embodiment.
Figure 11B:
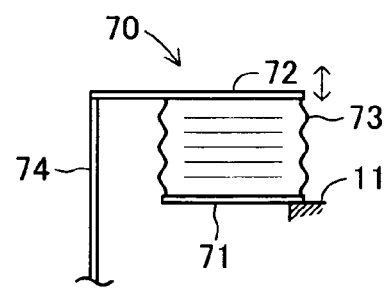
FIG. 11B is a schematic view for explaining the operation of the reflector of the reflection apparatus according to the fourth modified example.

Subsequently, a fourth modified example of the second embodiment will be explained. This fourth modified example uses a reflector 70 that is different from the reflector 51 as shown in FIGS. 11A and 11B, instead of the corner reflector serving as the reflector 51. This reflector 70 has a pair of upper and lower frames 71 and 72 extending horizontally, and a square reflection plate 73 is disposed between these frames 71 and 72. This reflection plate 73 is made of a metallic material that reflects the millimeter wave such as aluminum, and formed to be thin so as to be deformable. The frame 71 is fixed to the dummy object 11, and the frame 72 is coupled to a linear actuator 75 via a connection rod 74. The linear actuator 75 moves the frame 72 in the vertical direction by the displacement of the connection rod 74 in the vertical direction.

In the fourth modified example thus configured, the reflection state of the millimeter wave by the reflection plate 73, i.e., the reflection state of the reflector 70 changes with time by the vertical movement of the frame 72 as shown in FIG. 11B. Accordingly, the effect same as that in the second embodiment can be expected in the fourth modified example. It is to be noted that, although one end of the reflection plate 73 is displaced in the vertical direction in the fourth modified example, this displacement may be made in any direction.

Figure 12:
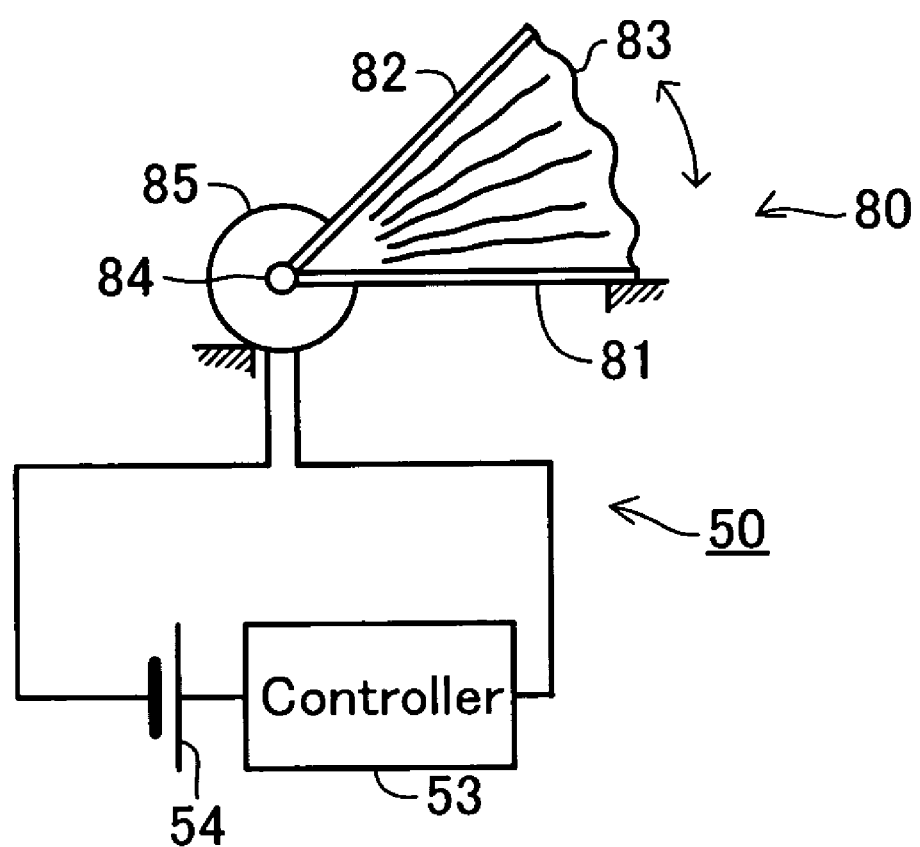
FIG. 12 is a schematic view of a reflection apparatus according to a fifth modified example of the second embodiment.

Subsequently, a fifth modified example of the second embodiment will be explained. This fifth modified example uses a reflector 80 that is different from the reflector 51 as shown in FIG. 12, instead of the corner reflector serving as the reflector 51. This reflector 80 has a pair of linear frames 81 and 82 that are connected to each other at each one end so as to be capable of rotating. A fan-like reflection plate 83 is disposed between the frames 81 and 82. This reflection plate 83 is made of a metallic material that reflects the millimeter wave such as aluminum, and formed to be thin so as to be deformable. The frame 81 is fixed to the dummy object 11, while the frame 82 is coupled to an electric motor 85 through a connection rod 84. The electric motor 85 pivots the frame 82 at the connection point of the frame 81 about the shaft of the connection rod 84.

In the fifth embodiment thus configured, when the electric motor 85 is operated, the frame 82 is rotated to change the reflection state of the millimeter wave of the reflection plate 83, i.e., the reflection state of the reflector 80 as shown in the figure. Accordingly, the effect same as that in the second embodiment can be expected in the fifth modified example. Plural types of the reflection apparatuses 50 explained above may be attached to the dummy object 11, or plural reflection apparatuses 50 of the same type may be attached to the dummy object 11.

The present invention is not limited to the aforesaid first and second embodiments and various modified examples. The invention can be modified within the scope of the invention.

For example, the dummy object 11 is formed into a human shape and the clothing 12 is put on the dummy object 11 to form the dummy doll 10 in any cases of the first embodiment and its various modified examples. However, this is accomplished since special emphasis is laid on the recognition of a pedestrian by the image sensors 3. If the test or inspection for the millimeter wave radar 2 is only performed, the shape of the dummy object 11 does not matter, and further, any shape may be employed instead of the clothing so long as it is a cloth. For example, the dummy object 11 having a shape of a rectangular solid or cylinder may be covered with a cloth. In this case, the method employed in the first embodiment and its modified examples may be employed in order to sway the cloth.

The same is true for the second embodiment and its various modified examples in this point. In this case, the reflection apparatus 50 employed in the second embodiment and its modified examples may be attached in the dummy object 11 having a shape of a rectangular solid or cylinder that is different from a human body.

The invention claimed is:

1. A test method for testing a vehicle collision prediction apparatus or a component thereof by using a testing apparatus for a vehicle collision prediction apparatus, comprising:
   a radar mounted on a vehicle;
   a dummy object spaced away from the radar; and
   a reflection plate attached to the dummy object, wherein the reflection plate has a first amount of reflection, and the dummy object has a second amount of reflection, wherein the second amount of reflection is less than the first amount of reflection, and wherein the reflection plate is configured to deform into a plurality of concave/convex portions; and
   a driving portion configured to move part of the reflection plate such that shapes of the concave/convex portions and a reflection state of the reflection plate are changed.

2. The test method according to claim 1, wherein a reflection area of the reflection plate is changed with time.

3. A testing apparatus for a vehicle collision prediction apparatus, comprising:
   a radar mounted on a vehicle;
   a dummy object spaced away from the radar; and
   a reflection plate attached to the dummy object,
   wherein the reflection plate has a first amount of reflection, and the dummy object has a second amount of reflection, wherein the second amount of reflection is less than the first amount of reflection, and wherein the reflection plate is configured to deform into a plurality of concave/convex portions; and
   a driving portion configured to move part of the reflection plate such that shapes of the concave/convex portions and a reflection state of the reflection plate are changed.

4. The testing apparatus according to claim 3, wherein plural reflection plates are attached to the dummy object.

5. The testing apparatus according to claim 3, wherein a drive means for displacing the reflection plate relative to the radar is attached to the dummy object.

6. The testing apparatus according to claim 3, wherein an area changing apparatus for changing a reflection area of the reflection plate with time is attached to the dummy object.

7. The testing apparatus according to claim 3, wherein the dummy object has a generally human shape.

8. The testing apparatus according to claim 3, wherein the dummy object is covered with a cloth.

* * * * *